May 6, 1969      T. J. O'CONNOR      3,443,054
QUICK-CHANGE TOOL FOR ELECTRICAL EROSION MACHINING
Filed Jan. 8, 1968
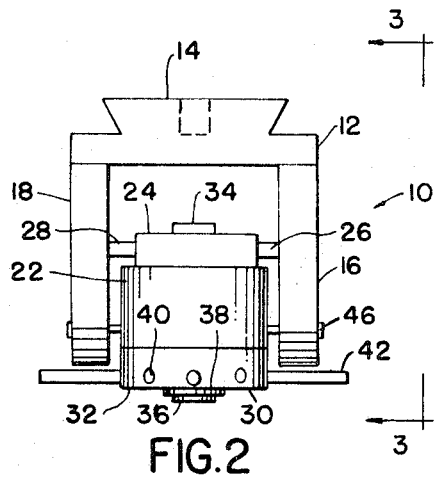
FIG.2
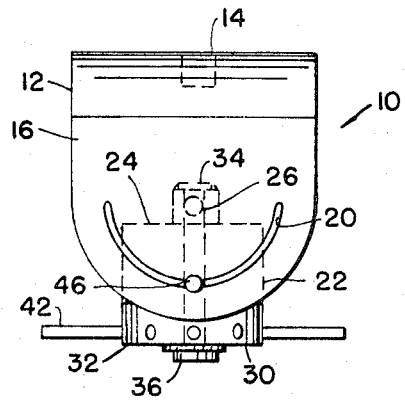
FIG.3
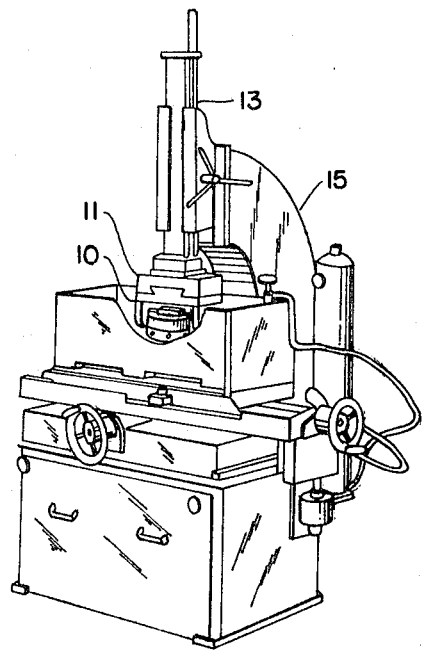
FIG.1
FIG.4
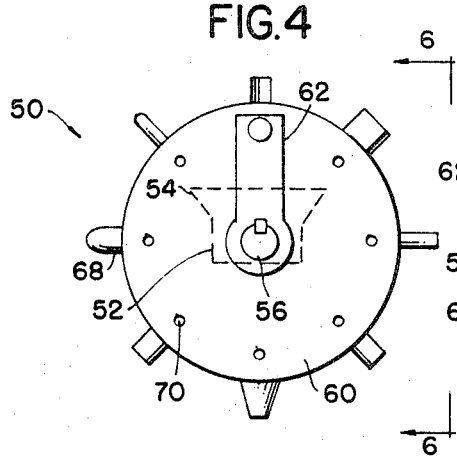
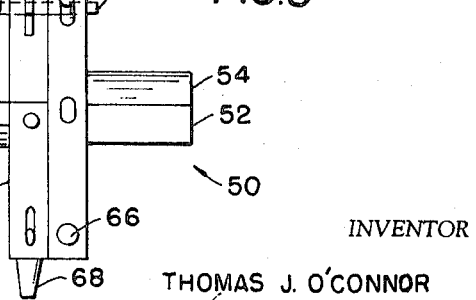
INVENTOR
THOMAS J. O'CONNOR
BY *Whittemore Hulbert & Belknap*
ATTORNEYS

United States Patent Office 3,443,054
Patented May 6, 1969

---

3,443,054
QUICK-CHANGE TOOL FOR ELECTRICAL
EROSION MACHINING
Thomas J. O'Connor, 100 Morgan Road,
Ann Arbor, Mich. 48104
Continuation-in-part of application Ser. No. 558,695,
June 20, 1966, which is a continuation-in-part of
application Ser. No. 504,971, Oct. 24, 1965, which
in turn is a continuation-in-part of application Ser.
No. 250,321, Jan. 9, 1963. This application Jan. 8,
1968, Ser. No. 696,282
Int. Cl. B23k 9/16
U.S. Cl. 219—69            10 Claims

ABSTRACT OF THE DISCLOSURE

A quick-change tool for use in electrical erosion machining capable of providing substantially universal positioning of a plurality of electrodes, simultaneously secured to the tool. The tool includes a dovetail base plate portion for rapidly and accurately securing the tool to electrical machining apparatus. In one embodiment the tool includes a base plate having a dovetail portion for securing the tool to electrical machining apparatus, a disc or a plurality of discs having a common axis of generation positioned side by side, rotatable about their axis of generation and having a plurality of angularly positioned radially extending peripheral openings therein in which separate electrodes may be secured, which disc or discs are rotatably secured to the base plate, and means for locking the disc or discs in selected indexed positions. In another embodiment the quick-change tool includes a base plate having a dovetail portion for rapid accurate securing of the tool to electrical machining apparatus, a chuck supported from the base for rotation about one end of the chuck, a disc having a plurality of angularly positioned radially extending peripheral openings therein in which separate electrodes may be secured connected to the other end of the chuck for rotation about its axis of generation which is perpendicular to the axis of rotation of the chuck and means for locking the disc in any rotated position thereof.

---

CROSS-REFERENCE TO RELATED APPLICATION

This application is a continuation-in-part of patent application Ser. No. 558,695, filed June 20, 1966, which is a continuation-in-part of patent application Ser. No. 504,-971, filed Oct. 24, 1965, now Patent No. 3,363,083, issued Jan. 9, 1968, which application is a continuation-in-part of patent application Ser. No. 250,321, filed Jan. 9, 1963, now Patent No. 3,222,494, issued Dec. 7, 1965.

BACKGROUND OF THE INVENTION

*Field of the invention*

The invention relates to electrical machining of conductive workpieces and refers more specifically to a quick-change tool for use with electrical machining apparatus to rapidly and accurately secure a plurality of electrodes to the electrical machining apparatus simultaneously and for providing substantially universal movement of the electrodes.

*Description of the prior art*

In the past electrical machining has usually been accomplished by a single electrode secured to the servo motor driven head of electrical machining apparatus so that when it was desired to change electrodes considerable down time of the electrical machining apparatus was required for positioning of a new electrode in the exact position of the old electrode. Wherein multiple electrodes have been provided in the past, they have usually been provided on separate electrical machining apparatus servo motor driven heads for simultaneous cutting.

SUMMARY OF THE INVENTION

In accordance with the invention there is provided a quick-change tool for rapidly and accurately securing a plurality of electrodes simultaneously to electrical machining apparatus. In addition the quick-change tool of the invention includes means for indexing the electrodes into a working position and for swinging the electrodes about a transverse axis through the tool to provide substantially universal positioning of the electrodes secured to the tool.

In one embodiment of the invention the quick-change tool is secured to the electrical machining apparatus by a dovetail base plate portion, an electrode chuck is provided which is pivoted about a transverse axis through one end thereof from the base plate of the tool, and a rotatable disc adapted to receive electrodes around the periphery thereof is positioned on the other end of the chuck for rotation about an axis perpendicular to and extending through said transverse axis, and means are included in the tool for locking the chuck and disc in any pivoted and rotated position thereof.

In a second modification of the invention the tool is again secured to electrical machining apparatus by a dovetail base plate portion, a plurality of discs is provided rotatably mounted on a shaft secured to the base plate having radially extending angularly separated peripheral openings therein for receiving separate electrodes, and the tool includes means for locking the discs in separately indexed positions thereof.

BRIEF DESCRIPTION OF THE DRAWINGS

FIGURE 1 is a perspective view of a mechanical section of electrical machining apparatus having a quick-change tool constructed in accordance with the invention secured thereto.

FIGURE 2 is an enlarged elevation view of the quick-change tool for electrical machining shown in FIGURE 1.

FIGURE 3 is another elevation view of the quick-change tool illustrated in FIGURE 2 taken substantially on the line 3—3 in FIGURE 2.

FIGURE 4 is an enlarged elevation view of a second embodiment of a quick-change tool for electrical machining apparatus constructed in accordance with the invention.

FIGURE 5 is another elevation view of the quick-change tool illustrated in FIGURE 4 taken substantially on the line 5—5 in FIGURE 4.

DESCRIPTION OF THE PREFERRED
EMBODIMENTS

The quick-change tool 10 illustrated in FIGURES 2 and 3 includes a base plate 12 having a dovetail portion 14 extending from one side thereof for securing the tool 10 to the insulated platen 11 on ram 13 of the mechanical section 15 of electrical machining apparatus, as shown in FIGURE 1. Supporting brackets 16 and 18 extend in spaced apart relation from the opposite side of the base plate 12 from the dovetail portion 14, as shown best in FIGURE 2. The brackets 16 and 18 are arcuate at their outer ends and are provided with arcuate slots 20 therein, as best shown in FIGURE 3.

An electrode chuck 22 is rotatably supported at end 24 from bearing stubs 26 and 28 mounted in the supporting brackets 16 and 18, as shown best in FIGURE 2. The chuck 22 is provided at the opposite end 30 with a disc 32 secured to the chuck 22 by means of the bolt 34 extending longitudinally through the chuck 22 in conjunction with the nut 36 and washer 38.

The disc 32 is rotatably mounted on the bolt 34 for rotation about the axis of generation thereof which is perpendicular to and extends through the longitudinal axis of the bearing stubs 26 and 28. A plurality of angularly spaced apart radially extending peripheral openings 40 are provided in the disc 32 to receive separate electrodes 42 therein. The electrodes 42 may be secured in the openings 40 by convenient means, such as setscrews or the like (not shown).

In operation, with the quick-change tool 10 secured to the mechanical section 15 of the electrical machining apparatus, as shown in FIGURE 1, and with a plurality of electrodes 42 secured in the openings 40 therefor in the disc 32, the chuck 22 may be pivoted ninety degrees either way from the position illustrated in FIGURES 2 and 3 about the axis of the bearing stubs 26 and 28 and locked in the pivoted position by means of bolts 46 extending through slots 20. The nut 36 may be loosened and the disc 30 rotated to position a desired electrode 42 in a cutting position after which the nut 36 is again tightened to lock the disc 30 in its adjusted position.

Electrical machining may then be accomplished in accordance with the usual procedures for electrical discharge machining, as set forth in more detail in the cross-referenced applications and patent, and the references cited therein, in conjunction with the mechanical section 15 of the electrical machining apparatus and a suitable power supply therefor, as is well known by those skilled in the art.

The quick-change tool 50 for electrical machining illustrated in FIGURES 4 and 5 again includes a base plate 52 having a dovetailed portion 54 for securing of the base plate to the mechanical section 15 of electrical machining apparatus. A shaft 56 is provided in tool 50 rigidly secured to the base plate 52, on which a plurality of discs 58 and 60 are rotatably mounted. Locking means for the discs 58 and 60 includes the locking member 62 fixedly secured to the shaft 56 and the pin 64.

As before the discs 58 and 60 include angularly spaced apart radially extending peripheral openings 66 therein for receiving separate electrodes 68. The discs further have indexing openings 70 therein spaced angularly thereabout, as best shown in FIGURE 4.

In use the quick-change tool 50 is again secured to the dovetail platen of the mechanical section 15 of the electrical machining apparatus and the desired electrodes are secured in the opening 66 in the discs 58 and 60. The discs 58 and 60 are then rotated to index the desired electrodes into the cutting position and the locking pin 64 which has been withdrawn from the discs 58 and 60 during indexing thereof is reinserted in the aligned opening 72 through the locking member 62 and the openings 70 in the indexed discs 58 and 60. Electrical machining is then accomplished in the usual manner.

While two embodiments of the present invention have been considered in detail, it will be understood that other embodiments and modifications of the invention are contemplated. For example, the discs 58 and 60 could be mounted so as to be locked in any desired rotational position thereof, as is the disc 30, and more discs could be added to the tool 50 and to the tool 10, if desired. It is the intention to include all such embodiments and modifications as are defined by the appended claims within the scope of the invention.

What I claim as my invention is:

1. A quick-change tool for electrical machining in conjunction with electrical machining apparatus comprising means for rapidly and accurately securing the tool to electrical machining apparatus for movement toward and away from a workpiece, chuck structure pivotally mounted to the means for securing the tool to the electrical machining apparatus, means for securing the chuck structure in a plurality of pivoted positions extending arcuately transverse of the direction of movement of the tool toward and away from a workpiece engaged with and operable between the means for securing the tool to electrical machining apparatus and the chuck structure, and means for radially securing a plurality of separate electrodes to the chuck structure for indexing into a plurality of machining positions rotatably secured to the chuck structure.

2. Structure as set forth in claim 1 wherein the means for rapidly and accurately securing the tool to electrical machining apparatus includes a dovetail tool base plate.

3. Structure as set forth in claim 1 wherein the means for maintaining the chuck structure in any pivoted position thereof comprises a pair of brackets connected to the means for securing the tool to the electrical machining apparatus having arcuate slots therein extending transversely of the direction of movement of the tool toward and away from a workpiece at opposite sides of the chuck structure and bolts extending through the arcuate slots on the opposite sides of the chuck structure and into the chuck structure.

4. Structure as set forth in claim 1 wherein the means for securing a plurality of electrodes to the chuck structure comprises at least one disc having radially extending angularly separated peripheral openings therein for receiving electrodes rotatably secured to the chuck structure and means for locking the disc in predetermined rotated positions.

5. Structure as set forth in claim 4 wherein a plurality of the rotatably mounted discs are coaxially rotatably secured to the chuck structure.

6. A quick-change tool for electrical machining comprising a base plate, means for securing the base plate to electrical machining apparatus, a pair of brackets extending from one side of the base plate having arcuate slots therein, chuck structure pivotally mounted at one end to the brackets, means for securing electrodes, extending substantially parallel to a chuck-transecting plane parallel to the pivot axis of the chuck structure, to the other end of the chuck structure and bolts extending through the arcuate slots in the brackets and into the chuck structure to secure the chuck structure in any pivoted position thereof.

7. A tool for electrical machining in conjunction with electrical machining apparatus comprising a base plate, means for securing the base plate to electrical machining apparatus, a stationary shaft extending from one end of the base plate, a plurality of discs rotatably mounted on the shaft having a plurality of angularly spaced apart radially extending peripheral openings therein for receiving electrodes, means operably associated with said discs for securing the electrodes in the radially extending openings, a plurality of radially outwardly positioned angularly spaced apart axially extending openings in the discs, a stationary radially extending locking member secured to the shaft having an opening therethrough registrable with the axial openings in the discs on rotation of the discs and a locking pin extending through the opening in the locking member and aligned axial openings in the discs for locking the disc in predetermined indexed positions relative to the shaft.

8. A quick-change tool for electrical machining in conjunction with electrical machining apparatus comprising means for rapidly and accurately securing the tool to electrical machining apparatus including a base plate having a dovetail portion on one side thereof, spaced apart supporting brackets extending from the base plate on the opposite side thereof, means for simultaneously supporting a plurality of electrical machining electrodes from the tool including an electrode chuck positioned between the brackets, pivot means secured to the brackets for pivotally mounting the electrode chuck for pivotal movement through one hundred eighty degrees about a transverse axis at one end of the chuck, means for locking the chuck in any pivoted position about said axis comprising arcuate slots in the brackets and bolts extending through the arcuate slots and into the chuck and means for supporting a plurality of electrodes from the other end of the chuck and for moving selective electrodes into predetermined machining positions.

9. Structure as set forth in claim 8 wherein the means for securing a plurality of electrodes to the chuck includes a disc rotatable about an axis perpendicular to and extending through the transverse axis about which the chuck is rotatable and means for locking the disc in any rotated positions thereof.

10. A quick-change tool for electrical machining in conjunction with electrical machining apparatus comprising means for rapidly and accurately securing the tool to electrical machining apparatus including a base plate having a dovetail portion on one side thereof, spaced apart supporting brackets extending from the base plate on the opposite side thereof, means for simultaneously supporting a plurality of electrical machining electrodes from the tool including an electrode chuck positioned between the brackets, pivot means secured to the brackets for pivotally mounting the electrode chuck for pivotal movement through one hundred eighty degrees about a transverse axis at one end of the chuck, means for locking the chuck in any pivoted position about said axis, means for supporting a plurality of electrodes on the other end of the chuck and moving selected electrodes into predetermined machining positions including a disc secured to the other end of the chuck and rotatable about an axis perpendicular to and extending through the transverse axis about which the chuck is pivoted and means for locking the disc in any rotated position thereof.

References Cited

UNITED STATES PATENTS

| | | | |
|---|---|---|---|
| 647,694 | 4/1900 | Burton | 219—78 |
| 2,009,647 | 7/1935 | Brusse et al. | 219—86 |
| 2,278,104 | 3/1942 | Harter | 219—86 |
| 2,539,439 | 1/1951 | Kumler. | |
| 2,908,804 | 10/1959 | Watter et al. | 219—86 |

RICHARD M. WOOD, *Primary Examiner.*

R. F. STAUBLY, *Assistant Examiner.*

U.S. Cl. X.R.

204—143